Patented July 12, 1927.

1,635,244

UNITED STATES PATENT OFFICE.

BROADUS BAILEY, OF GREENVILLE, SOUTH CAROLINA.

CLEANING COMPOSITION AND METHOD OF MAKING SAME.

No Drawing. Application filed January 24, 1927. Serial No. 163,316.

My invention relates to a composition for cleaning oil painted surfaces, tile, enamel and the like and the method of making the same.

An important object of the invention is to provide a composition of the above mentioned character which is adapted to clean oil painted surfaces, without leaving streaks or spots, and without injury to such surface.

A further object of the invention is to provide a composition of the above mentioned character, which is adapted to be sold in cans or like receptacles, in the paste form ready for immediate use.

Other objects and advantages of the invention will be apparent during the course of the following description.

The composition preferably embodies the following ingredients, preferably present in the proportions stated:

| | Parts by weight. |
|---|---|
| Sodium bicarbonate | 7.50 |
| Sodium silicate | 37.00 |
| Powdered pumice stone | 7.50 |
| Soap | 14.50 |
| Water | 27.00 |
| Oil of sassafras | 0.20 |
| Glycerine | 6.30 |
| Methylene blue | 0.0065 |

In the production of the composition the water above referred to is first introduced into the inner container of a double boiler, and is heated therein to a temperature of from 190° F. to 195° F., and the methylene blue is now added, and the mass thoroughly stirred. The soap which is preferably in the solid form is cut or finely divided, and introduced into the heated solution and the mass thoroughly stirred, until the soap is dissolved in the liquid. The sodium bicarbonate is next added and the mass thoroughly stirred. The sodium silicate is next added and the mass thoroughly stirred, and after this the powdered pumice stone is added and the mass thoroughly stirred. The temperature of the mass is preferably maintained substantially uniform during the entire mixing process, that is, it is heated from 190° F. to 195° F.

The mass is now removed from the container and without any attempt to prevent cooling, is introduced into a mixing and grinding device, such as into a large mortar, and by means of a pestle the mass is thoroughly ground. During this grinding operation the mass preferably has a temperature of about 135° F. to 140° F., and the glycerine is added during this grinding. After this operation the mass is allowed to further cool to a temperature of about 90° F. to 95° F., and the oil of sassafras is added and the mass further mixed and ground. After this the mass is allowed to cool to atmospheric temperature, and is again subjected to a mixing and grinding operation, to break up any lumps which may have formed, and to produce a homogeneous pasty mass, as the final product. It is then ready to be put into cans or other receptacles which are preferably hermetically sealed for shipment.

The function of the sodium bicarbonate is to act as a mild alkali, saponifying the grease present upon the surface being cleaned, and changing the same into soap, which in turn is easily washed off, thereby removing any grease spots from the surface, without any undue scrubbing action, which might tend to scratch or injure the oil painted surface. The sodium silicate is a cleaner and emulsifies and has a tendency to renew and fix colors, on oil painted surfaces. It aids the soap in cleaning without undue scrubbing action, whereby the dirt, stains, etc., are removed, without injury to the oil painted surface. The powdered pumice stone serves principally as an abrasive material, and is present in fine powdered form, such as impalpable powder, and will not scratch the oil painted surface. The soap is employed as the cleansing agent to remove the stains, dirt, smoke, etc., smoothly and thoroughly after they have been acted upon, loosened, etc., by the other ingredients of the composition. The water is employed as a solvent and for the purpose of rendering the preparation in the form of a paste. The oil of sassafras is added to impart to the product a pleasant odor. The glycerine is added to retain the product in the form of a smooth paste and retard evaporation, even though the preparation is exposed to the atmosphere, for a reasonable length of time. The methylene blue is added to impart a bluish color to the composition.

The effective ingredients of the product are sodium bicarbonate, sodium silicate, powdered pumice stone, soap, water and glycerine. They are all present for a definite purpose, as above stated, each doing its part for the accomplishment of the single result of properly cleaning oil painted surfaces, without injury thereto. The oil of sassafras and methylene blue are preferably added for the purposes stated and render the product attractive as to smell and color, but might be dispensed with, if desired.

The product is adapted to be used for cleaning oil painted surfaces, such as walls, ceilings, woodwork, etc. It is in the form of a smooth paste and is applied upon a damp sponge or soft cloth, and is thereby gently rubbed upon the oil painted surface. After the dirt, grease, spots, etc., have been removed, the surface is preferably rinsed off with a soft damp cloth, preferably a turkish towel. The paste may also be advantageously employed in cleansing tile, enamel or like surfaces.

It is to be understood that the form of my invention, herein described is to be taken as a preferred example of the same, and that certain changes may be resorted to in the order of the steps of the method of combining the ingredients and that chemical equivalents may be employed in the composition, without departing from the spirit of my invention or the scope of the subjoined claims.

Having thus described my invention, I claim:

1. A preparation for cleaning oil painted surfaces, tile, enamel and the like, comprising substantially 7.50 parts by weight of sodium bicarbonate, 37.00 parts by weight of sodium silicate, 7.50 parts by weight of an impalpably powdered abrasive material, 14.50 parts by weight of soap, 27.00 parts by weight of water, and 6.30 parts by weight of glycerine.

2. The process of producing a cleansing composition, comprising heating water and introducing into the heated water methylene blue and agitating the mass, then introducing soap into the mass while retaining the same heated and agitating the mass, introducing sodium bicarbonate into the heated mass and agitating the mass, introducing sodium silicate into the mass and agitating the mass, and introducing powdered pumice stone into the mass and agitating the same, allowing the mass to somewhat cool and subjecting the same to a grinding operation in the presence of the added glycerine, allowing the mass to further cool and introducing an odor imparting substance, allowing the mass to further cool to atmospheric temperature, and again grinding for producing a homogeneous pasty mass.

3. A preparation having a pasty consistency and adapted for cleaning oil painted surfaces, tile, enamel or the like, comprising sodium bicarbonate, sodium silicate, impalpably powdered pumice stone, soap, water and gylcerine, the sodium bicarbonate and the impalpably powdered pumice stone being present in substantially the same parts by weight and the sodium silicate being present in a preponderance by weight with respect to the sodium bicarbonate.

4. A preparation having a pasty consistency adapted for cleaning oil painted surfaces, tile, enamel, or the like, comprising sodium bicarbonate, sodium silicate, impalpably powdered pumice stone, soap, water and glycerine, the sodium bicarbonate, impalpably powdered pumice stone and glycerine being present in approximately the same parts by weight, the sodium silicate being present in approximately five parts by weight to one part by weight of the sodium bicarbonate, the soap being present in excess by weight with respect to the weight of the sodium bicarbonate and the water being present by weight in excess to the weight of the soap.

In testimony whereof I affix my signature.

BROADUS BAILEY.